Sept. 5, 1967         S. R. OVSHINSKY         3,340,405
ALTERNATING CURRENT PHASE CONTROL CIRCUIT
Filed July 5, 1966         2 Sheets-Sheet 2
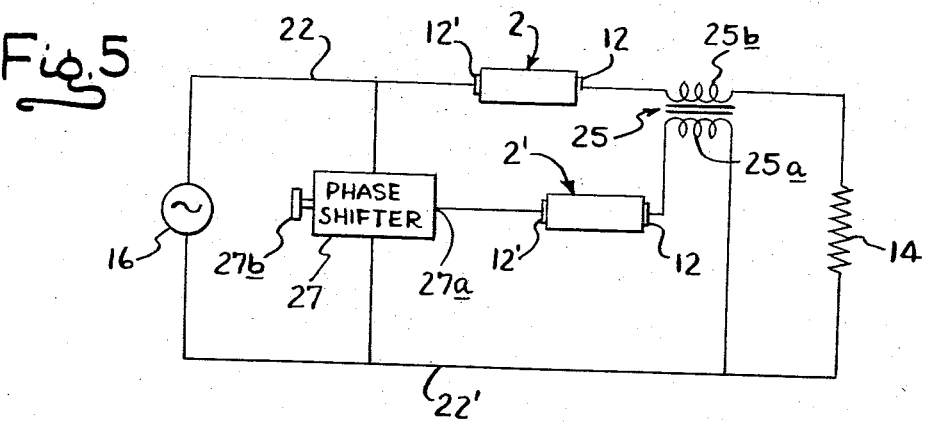
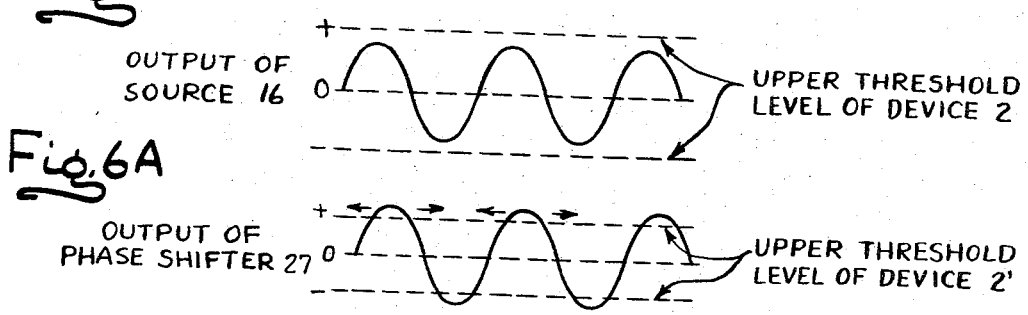
INVENTOR
STANFORD R. OVSHINSKY
by: Wallenstein, Spangenberg &
Hattis         ATTYS.

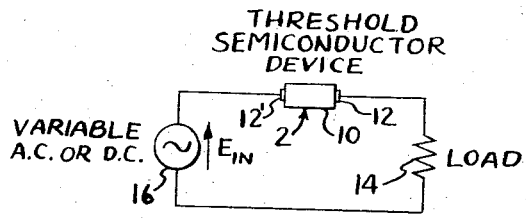
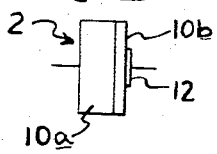
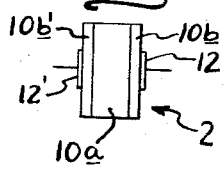
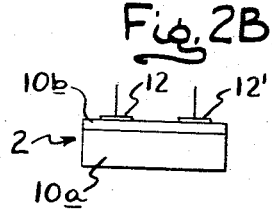
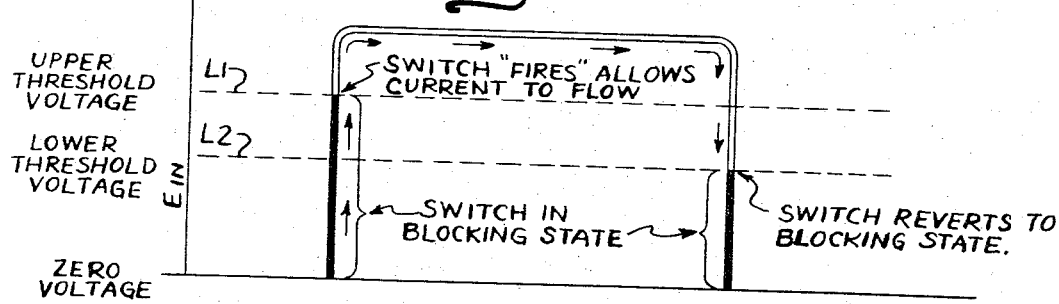
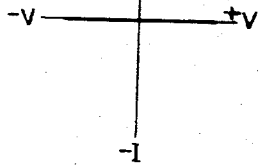
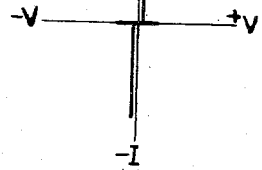

United States Patent Office 3,340,405
Patented Sept. 5, 1967

3,340,405
ALTERNATING CURRENT PHASE CONTROL CIRCUIT
Stanford R. Ovshinsky, Bloomfield Hills, Mich., assignor to Energy Conversion Devices, Inc., Troy, Mich., a corporation of Delaware
Filed July 5, 1966, Ser. No. 562,796
5 Claims. (Cl. 307—88.5)

ABSTRACT OF THE DISCLOSURE

An alternating current phase control circuit having in the load circuit the load, a transformer secondary and a bidirectional switching device, such as disclosed in U.S. Patent No. 3,271,591, and a control circuit including in series a phase shifter means, the transformer primary and a bi-directional switching device, such as disclosed in U.S. Patent No. 3,271,591, for controlling the time in each half cycle that the load circuit is closed by the first mentioned bi-directional switching device.

---

This application is a continuation-in-part of copending application Ser. No. 358,854, filed Apr. 10, 1964, and forfeited, which in turn is a continuation-in-part of copending applications Ser. No. 118,642, filed June 21, 1961, and abandoned; Ser. No. 226,843, filed Sept. 28, 1962, and forfeited; Ser. No. 252,510, filed Jan. 18, 1963, and abandoned; Ser. No. 252,511, filed Jan. 18, 1963, and forfeited; Ser. No. 252,467, filed Jan. 18, 1963, and abandoned; Ser. No. 288,241, filed June 17, 1963, and abandoned; and Ser. No. 310,407, filed Sept. 20, 1963, now Patent No. 3,271,591.

The present invention relates to an alternating current (A.C.) phase control circuit wherein a solid state switch connected in series between a source of alternating current and a load is alternately opened and closed for controlled durations during each half cycle of the alternating current waveform involved. The present invention thus has an application, for example, to circuits for controlling the average power to a load circuit, such as a stage light circuit or the like, where the intensity of the light is to be changed at will.

Phase control circuits using semiconductor switch devices are known in the art for both direct current and A.C. circuits. These circuits frequently use silicon control rectifiers (SCR) devices. An SCR device has two load terminals connected in series with the load and a control terminal to which timing pulses must be fed to control the open and closed states of the switch devices. These SCR devices allow current to flow in only one direction so in A.C. circuits two such devices are connected in reversed parallel relation and are separately controlled. These SCR phase control circuits require relatively complex auxiliary timing pulse generator circuits for generating variable phase control pulses which are fed to the control terminals of the SCR switch devices. For A.C. phase control applications requiring precise symmetrical operation in successive half cycles, there is difficulty in getting perfectly matched SCR switch devices required by such a circuit.

Two terminal five-layer diodes have been developed in recent years which can be substituted for the parallel reverse connected SCR devices in A.C. phase control circuits. However, such devices require relatively complex auxiliary timing pulse generator circuits when they are used in 110 volts circuits energized from 60 cycle per second commercial power systems because they require much faster changing (i.e. steep sided) control voltage waveforms. Moreover, it is difficult to mass produce substantially perfectly symmetrical five-layer diodes and such devices are relatively costly.

One of the objects of the present invention is to provide an A.C. phase control circuit of the type generally referred to above wherein the switch devices used therein are most advantageously two-terminal, bi-directional semiconductor switch devices which can be controlled by 60 cycle per second control signals (as well as control signals of other frequencies), so that no auxiliary pulse generator circuit need be utilized for controlling the phasing of the switch devices. A related object of the invention is to provide an A.C. phase control circuit as described wherein the bi-directional semiconductor switch devices used in the circuit are inherently perfectly symmetrically operating devices.

Another object of the invention is to provide an A.C. phase control circuit which uses bi-directional semiconductor switch devices which are much less expensive than the five-layer diodes referred to and the circuit is otherwise of a simple and reliable design.

The A.C. phase control circuit of the invention makes use of a newly developed symmetrical semiconductor device to be referred to as a threshold semiconductor device or current controlling device. (Such a device is referred to in said copending application Ser. No. 310,407 as a mechanism device.)

The threshold semiconductor device presents a very high resistance (e.g. one to ten megohms and higher) under normal voltage conditions of any polarity, a very low resistance (about one ohm or less) when a voltage of any polarity above a given upper threshold level is applied thereto, the change from the high to the low resistance condition occurring substantially instantaneously, and automatically resets itself substantially instantaneously to its high resistance state when the current flow therethrough drops below a given level. The threshold semiconductor device is normally in a high resistance or blocking state or condition. When a voltage is applied thereto above the upper threshold level, at least portions or paths of the device are substantially instantaneously changed to another state or condition of low resistance and act substantially as a conductor. Said at least portions or paths of the device remain in the conducting state or condition until the current flow therethrough decreases to a minimum value near zero. When the applied voltage decreases to a value to decrease the current flow to said minimum value, said at least portions or paths of the device substantially instantaneously change from their low resistance or conducting state or condition back to their high resistance or blocking state or condition.

The present invention takes advantage of the characteristics of the threshold semiconductor device described above to provide an exceedingly simple and reliable A.C. phase control circuit. The newly developed threshold semiconductor device just described has a number of important advantages, the most important of which are that it is an inherently perfectly symmetrical device, since it is a one layer type semiconductor device which has bidirectional properties unlike the multilayer semiconductor devices above mentioned; it can be manufactured at an exceedingly low cost; it is compact; it has an exceedingly high leakage resistance in its blocking condition and a small voltage drop in its conducting condition so that there is negligible power loss in the device; and it can be controlled by a 60 cycle per second power line frequency, making auxiliary control voltage sources unnecessary.

In the A.C. phase control circuit of the present invention a first threshold semiconductor device is positioned in series between a source of A.C. voltage whose peak value is less than the upper threshold level of the first threshold semiconductor device and a load. The secondary winding of a transformer is also positioned in series with the flow of current through the device and the load. An A.C. voltage of varying phase and of the same frequency as the source of A.C. voltage is induced in the secondary winding of the transformer which raises the total applied voltage across the first threshold semiconductor device above the upper threshold level thereof which fires the same into its conductive state or condition, which continues for substantially the remainder of the half cycle involved until the current reduces to a minimum value. This sequence of operation continues each half cycle of the A.C. signal involved with the phase angle of conduction of the first threshold semiconductor device varying with the phase of the voltage induced in the secondary winding.

The circuit for providing the variable phase voltage in the secondary winding of the transformer may take a variety of forms. In the preferred form of the present invention, a conventional A.C. phase shifter is coupled across the source of A.C. voltage to provide a variable phase voltage at the same frequency as the output of the source of A.C. voltage. The output of the phase shifter is fed to a second semiconductor threshold device, the peak value of the output of the phase shifter exceeding the upper threshold level of the second device. The output of the second threshold semiconductor device is fed through the primary winding of the transformer so that, when the output of the phase shifter reaches the upper threshold level of the second threshold semiconductor device, the latter will fire and couple the output of the phase shifter through the primary of the transformer. This voltage is induced to the secondary winding of the transformer and adds to the output of the source of applied voltage to provide a resultant voltage which fires the first threshold semiconductor device.

The above and other objects, features and advantages of the present invention will become apparent upon making reference to the specification to follow, the claims and the drawings wherein:

FIG. 1 is a schematic representation of the threshold semiconductor device described above in a circuit including a load and a source of voltage for controlling the load;

FIGS. 2, 2A and 2B illustrate a few exemplary physical forms of the threshold semiconductor device shown in FIG. 1;

FIG. 3 is a diagram illustrating the operation of the threshold semiconductor device in FIG. 1;

FIGS. 4 and 4A illustrate the voltage-current characteristics for the two operating states of the threshold semiconductor device of FIG. 1 in an A.C. circuit;

FIG. 5 illustrates an A.C. phase control circuit incorporating the features of the present invention; and FIGS. 6 and 6A illustrate on a common time base waveforms in different parts of the circuit of FIG. 5 in relation to the upper threshold levels of the threshold semiconductor devices therein.

For an understanding of the nature and manner of operation of the threshold semiconductor device, reference is first made to FIGS. 1 to 4A of the drawings. In FIG. 1, which illustrates a typical simple load circuit, the threshold semiconductor device 2 used in the present invention has a body 10 which may take a variety of forms and includes, as a surface film or as the entire body 10 or as a part thereof, an active bi-directional semiconductor material having very unique and advantageous properties to be described. The body 10 includes a pair of electrodes 12–12' electrically connecting the same with a load 14 and a source of voltage 16. In the generalized situation, the source of voltage 16 may be a source of alternating or direct current. (In the present invention, however, the voltage source will constitute a source of A.C. voltage.)

The threshold semiconductor device is symmetrical in its operation and contains non-rectifying active solid state semiconductor materials and electrodes in non-rectifying contact therewith for controlling the current flow therethrough substantially equally in either or both directions. In their high resistance or blocking condition these materials may be crystalline like materials or, preferably, materials of the polymeric type including polymeric networks and the like having covalent bonding and cross linking highly resistant to crystallization, which are in a locally organized disordered solid state condition which is generally amorphous (not crystalline) but which may possibly contain relatively small crystals or chain or ring segments which would probably be maintained in randomly oriented position therein by the cross linking. These polymeric structures may be one, two or three dimensional structures. While many different materials may be utilized, for example, these materials can be tellurides, selenides, sulfides or oxides of substantially any metal, or metalloid, or intermetallic compound, or semiconductor or solid solutions or mixtures thereof, particularly good results being obtained where tellurium or selenium are utilized.

It is believed that the cooperating materials (metals, metalloids, intermetallic compounds or semiconductors), which may form compounds, or solid solutions or mixtures with the other materials in the solid state semiconductor materials, operate, or have a strong tendency to operate, to inhibit crystallization in the semiconductor materials, and it is believed that this crystallization inhibiting tendency is particularly pronounced where the percentages of the materials are relatively remote from the stoichiometric and eutectic ratios of the materials, and/or where the materials themselves have strong crystal inhibiting characteristics, such as, for example, arsenic, gallium and the like. As a result, where, as here, the semiconductor materials have strong crystallization inhibiting characteristics, they will remain in or revert to their disordered or generally amorphous state or condition.

The following are specific examples of some of the semiconductor materials which have given satisfactory results in a threshold semiconductor device (the percentages being by weight):

25% arsenic and 75% of a mixture 90% tellurium and 10% germanium; also, with the addition of 5% silicon;
75% tellurium and 25% arsenic;
71.8% tellurium, 14.05% arsenic, 13.06% gallium and the remainder lead sulfide;
72.6% tellurium, 17.2% arsenic and 13.2% gallium;
72.6% tellurium, 27.4% gallium arsenide;
85% tellurium, 12% germanium and 3% silicon;
50% tellurium, 50% gallium;
67.2% tellurium, 25.3% gallium arsenide and 7.5% n-type germanium;
75% tellurium and 25% silicon;
75% tellurium and 25% indium antimonide;
55% tellurium and 45% germanium;
45% tellurium and 55% germanium;
75% selenium and 25% arsenic;
50% aluminum telluride and 50% indium telluride;
50% aluminum telluride and 50% gallium telluride; and
50% tellurium, and 50% aluminum In forming the solid state semiconductor materials of this invention, the materials may be ground in an unglazed porcelain mortar to an even powder consistency and thoroughly mixed. They then may be heated in a sealed quartz tube to above the melting point of the material which has the highest melting point. The molten materials may be cooled in the tube and then broken or cut into pieces, with the pieces ground to proper shape to form the bodies 10, or the molten materials may be cast from the tube into preheated graphite molds to form the bodies. The initial grinding of the materials may be done in the presence of air or in the absence of air, the former being preferable where considerable oxides are desired in the ultimate bodies 10. Alternatively, in forming the bodies 10 it may be desirable to press the mixed powdered materials under pressures up to at least 1000 p.s.i. until the powdered materials are completely compacted, and then the completely compacted materials may be appropriately heated.

In some instances it has been found, particularly where arsenic is present in the bodies 10 formed in the foregoing manner, that the bodies are in a disordered or generally amorphous solid state, the high resistance or blocking state. In such instances, bare electrodes can be and have been embedded in the bodies during the formation thereof, to provide the threshold semiconductor devices of this invention wherein the control of the electric current is accomplished in the bulk of the solid state semiconductor materials.

In other instances, it has been found that the bodies 10 formed in the foregoing manner are in a crystalline like solid state, which may be a low resistance or conducting state, probably due to the slow cooling of the semiconductor materials during the formation of the bodies. In these instances, it is necessary to change the bodies or portions thereof or the surfaces thereof to their disordered or generally amorphous state, and this may be accomplished in various ways, as for example: utilizing impure materials, adding impurities; including oxides in the bulk and/or in the surfaces or interfaces; mechanically by machining, sandblasting, impacting, bending, etching or subjecting to ultrasonic waves; metallurgically forming physical lattice deformations by heat treating and quick quenching or by high energy radiation with alpha, beta or gamma rays; chemically by means of oxygen, nitric or hydrofluoric acid, chlorine, sulphur, carbon, gold, nickle, iron or manganese inclusions, or ionic composition inclusions comprising alkali or alkaline earth metal compositions; electrically by electrical pulsing; or combinations thereof.

Where the entire bodies are changed in any of the foregoing manners to their disordered or generally amorphous solid state, bare electrodes may be embedded therein during the formation of the bodies and the current control by such solid state current controlling devices would be in the bulk. Another manner of obtaining current control in the bulk is to embed in the bodies electrodes which, except for their tips, are provided with electrical insulation, such as an oxide of the electrode material. Current pulses are then applied to the electrodes to cause the effective semiconductor material between the uninsulated tips of the electrodes to assume the disordered or generally amorphous solid state.

The control of current by the threshold semiconductor devices of this invention can also be accomplished by surfaces or films of the semiconductor materials, particularly good results being here obtained. Here, the bodies of the semiconductor material, which are in a low resistance crystalline like solid state, may have their surfaces treated in the foregoing manners to provide surfaces or films which are in their disordered or generally amorphous solid state. Electrodes are suitably applied to the surfaces or films of such treated bodies, and since the bulk of the bodies is in the crystalline like solid state and the surfaces or films are in the disorganized or generally amorphous state (high resistance or substantially an insulator), the control of the current between the electrodes is mainly accomplished by the surfaces or films.

Instead of forming the complete body 10, the foregoing solid state semiconductor materials may be coated on a suitable smooth substrate, which may be a conductor or an insulator as by vacuum deposition or the like, to provide surfaces or films of the semiconductor material on the substrate which surfaces or films are in their disordered or generally amorphous solid state (high resistance or substantially an insulator). The solid state semiconductor materials normally assume this state probably because of rapid cooling of the materials as they are deposited or they may be readily made to assume such state in the manners described above. Electrodes are suitably applied to the surfaces or films on the substrate and the control of the current is accomplished by the surfaces or films. If the substrate is a conductor, the control of the current is through the surfaces or films between the electrodes and the substrate, and, if desired, the substrate itself may form an electrode. If the substrate is an insulator, the control of the current is along the surfaces or films between the electrodes. A particularly satisfactory device which is extremely accurate and repeatable in production has been produced by vapor depositing on a smooth substrate a thin film of tellurium, arsenic and germanium and by applying tungsten electrodes to the deposited film. The film may be formed by depositing these materials at the same time to provide a uniform and fixed film, or the film may be formed by depositing in sequence layers of tellurium, arsenic, germanium, arsenic and tellurium, and in the latter case, the depositioned layers are then heated to a temperature below the sublimation point of the arsenic to unify and fix the film. The thickness of the surfaces or films, whether formed on the bodies by suitable treatment thereof or by deposition on substrates may be in a range up to a thickness of a few ten-thousandths of an inch or even up to a thickness of a few hundredths of an inch or more.

The electrodes which are utilized in the threshold semiconductor devices of this invention may be substantially any good electrical conductor, preferably high melting point materials, such as tantalum, graphite, tungsten, niobium and molybdenum. These electrodes are usually relatively inert with respect to the various aforementioned semiconductor materials.

The electrodes when not embedded in the bodies 10 in the instances discussed above, may be applied to the surfaces or films of bodies, or to the surfaces or films deposited on the substrates in any desired manner, as by mechanically pressing them in place, by fusing them in place, by soldering them in place, by vapor deposition or the like. Preferably, after the electrodes are applied, a pulse of voltage and current is applied to devices for conditioning and fixing the electrical contact between the electrodes and the semiconductor materials. The devices may be encapsulated if desired.

It is believed that the generally amorphous polymeric like semiconductor materials have substantial current carrier restraining centers and a relatively large energy gap, that they have a relatively small mean free path for the current carriers, large spatial potential fluctuations and relatively few free current carriers due to the amorphous structure and the current carrier restraining centers therein for providing the high resistance or blocking state or condition. It is also believed that the crystalline like materials in their high resistance or blocking state or condition have substantial current carrier restraining centers and have a relatively large mean free path for the current carriers due to the crystal lattice structure and hence a relatively high current carrier mobility, but that there are relatively few free current carriers due to the substantial current carrier restraining centers therein, a relatively large energy gap therein, and large spatial potential fluctuations therein for providing the high resistance or blocking state or condition. It is further believed that the amorphous type semiconductor materials may have a higher resistance at the ordinary and usual temperatures of use, a greater nonlinear negative temperature-resistance coefficient, a lower heat conductivity coefficient, and a greater change in electrical conductivity between the blocking state or condition and the conducting state or condition than the crystalline type of seminconductor materials, and thus be more suitable for many applications of this invention. By appropriate selection of materials and dimensions, the high resistance values may be predetermined and they may be made to run into millions of ohms, if desired.

As an electrical field is applied to the semiconductor material (either the crystalline type or the amorphous type) of a device of this invention in its blocking state or condition, such as a voltage applied to the electrodes, the resistance of at least portions or paths of the semiconductor material between the electrodes decreases gradually and slowly as the applied field increases until such time as the applied field or voltage increase to a threshold value, whereupon said at least portions of the semiconductor material, at least one path between the electrodes, are substantially instantaneously changed to a low resistance or conducting state or condition for conducting current therethrough. It is believed that the applied threshold field or voltage causes firing or breakdown or "switching" of said at least portions or paths of the semiconductor material, and that the breakdown may be electrical or thermal or a combination of both, the electrical breakdown caused by the electrical field or voltage being more pronounced where the distance between the electrodes is small, as small as a fraction of a micron or so, and the thermal breakdown caused by the electrical field or voltage being more pronounced for greater distances between the electrodes. For some crystalline like materials the distances between the electrodes can be so small that barrier rectification and p-n junction operation are impossible due to the distances being beneath the transition length or barrier height. The "switching" times for switching from the blocking state to the conducting state are extremely short, less than a few microseconds.

The electrical breakdown may be due to rapid release, multiplication and conduction of current carriers in avalanche fashion under the influence of the applied electrical field or voltage, which may result from external field emission, internal field emission, impact or collision ionization from current carrier restraining centers (traps, recombination centers or the like), impact or collision ionization from valence bands, much like that occurring at breakdown in a gaseous discharge tube, or by lowering the height or decreasing the width of possible potential barriers and tunneling or the like may also be possible. It is believed that the local organization of the atoms and their spatial relationship in the crystal lattices in the crystalline type materials and the local organization and the spatial relationship between the atoms or small crystals or chain or ring segments in the amorphous type materials, at breakdown, are such as to provide at least a minimum mean free path for the current carriers released by the electrical field or voltage which is sufficient to allow adequate acceleration of the free current carriers by the applied electrical field or voltage to provide the impact or collision ionization and electrical breakdown. It is also believed that such a minimum mean free path for the current carriers may be inherently present in the amorphous structure and that the current conducting condition is greatly dependent upon the local organization for both the amorphous and crystalline conditions. As expressed above a relatively large mean free path for the current carriers can be present in the crystalline structure.

The thermal breakdown may be due to Joule heating of said at least portions or paths of the semiconductor material by the applied electrical field or voltage, the semiconductor material having a substantial non-linear negative temperature-resistance coefficient and a minimal heat conductivity coefficient, and the resistance of said at least portions or paths of the semiconductor material rapidly decreasing upon such heating thereof. In this respect, it is believed that such decrease in resistance increases the current and rapidly heats by Joule heating said at least portions or paths of the semiconductor material to thermally release the current carriers to be accelerated in the mean free path by the applied electrical field or voltage to provide for rapid release, multiplication and conduction of current carriers in avalanche fashion and, hence, breakdown, and, especially in the amorphous condition, the overlapping of orbitals by virtue of the type of local organization can create different sub-bands in the band structure.

It is also believed that the current so initiated between the electrodes at breakdown (electrically, thermally or both) causes at least portions or paths of the semiconductor material between the electrodes to be substantially instantaneously heated by Joule heat, that at such increased temperatures and under the influence of the electrical field or voltage, further current carriers are released, multiplied and conducted in avalanche fashion to provide high current density, and a low resistance or conducting state or condition which remains at a greatly reduced applied voltage. It is possible that the increase in mobility of the current carriers at high temperature and higher electric field strength is due to the fact that the current carriers being excited to higher energy states populate bands of lower effective mass and, hence, higher mobility than at lower temperatures and electric field strengths. The possibility for tunneling increases with lower effective mass and higher mobility. It is also possible that a space charge can be established due to the possibility of the current carriers having different masses and mobilities and since an inhomogeneous electric field could be established which would continuously elevate current carriers from one mobility to another in a regenerative fashion. As the current densities of the devices decrease, the current carrier mobilities decrease and, therefore, their capture possibilities increase. In the conducting state or condition the current carriers would be more energetic than their surroundings and would be considered as being hot. It is not clear at what point the minority carriers present could have an influence on the conducting process, but there is a possibility that they may enter and dominate, i.e. become majority carriers at certain critical levels.

It is further believed that the amount of increase in the mean free path for the current carriers in the amorphous like semiconductor material and the increased current carrier mobility are dependent upon the amount of increase in temperature and field strength, and it is possible that said at least portions or paths of some of the amorphous like semiconductor materials are electrically activated and heated to at least a critical transition temperature, such as a glass transition temperature, where softening begins to take place. Thus, due to such increase in mean free path for the current carriers, the current carriers produced and released by the applied electrical field or voltage are rapidly released, multiplied and conducted in avalanche fashion under the influence of the applied electrical field or voltage to provide and maintain a low resistance or conducting state or condition.

The voltage across the device in its low resistance or conducting state or condition remains substantially constant although the current may increase and decrease greatly. In this connection, it is believed that the conducting filaments or threads or paths between the electrodes increase and decrease in cross section as the current increases and decreases for providing the substantially constant voltage condition while conducting. When the current through said at least portions or paths of the semiconductor material decreases to a minimum current holding value which is near zero, it is believed that there is insufficient current to maintain the same in their low resistance or conducting state or condition, whereupon they substantially instantaneously change or revert to their high resistance of blocking state or condition. In other words, the conducting filaments or threads or paths between the electrodes are interrupted when this condition occurs. The decrease in current below the minimum current holding value may be brought about by decreasing the applied voltage to a low value. Said at least portions or paths of the semiconductor material may again be substantially instantaneously changed to their low resistance or conducting state or condition when they are again activated by the voltage applied thereto. The ratio of the blocking resistance to the resistance in the conducting state or condition is extremely high, as for example, larger than 100,000:1. In its low resistance or conducting state or condition the resistance may be as low as 1 ohm or less as determined by the small voltage drop thereacross and the holding current for the device may be near zero.

The voltage-current characteristics of the current controlling device are reversible and are generally independent of the load resistance and independent of whether D.C. or A.C. is used. The manner in which the current controlling device operates in a load circuit powered by an A.C. voltage (FIG. 1) is illustrated by the diagram of FIG. 3 and by the voltage-current curves of FIGS. 4 and 4A. When the device 2 is in its high resistance or blocking state or condition and the applied A.C. voltage is less than the threshold or breakdown voltage value of the device, the device remains in its high resistance or blocking state or condition as indicated in FIGS. 3 and 4. When the peak or RMS value of the A.C. applied voltage is raised to at least the breakdown or upper threshold voltage level L1 shown in FIG. 3 (the actual voltage value will obviously be different in the two cases), the device fires and causes said at least portions or paths of the semiconductor material to switch or change to the low resistance or conducting state or condition as indicated in FIGS. 3 and 4A. It is noted that the curves in FIG. 4A are slightly off-set from the center which represents the small resistance of the device 2 and the small and substantially constant voltage drop thereacross in its low resistance or conducting state or condition. It is also noted in FIG. 4A that the device intermittently assumes its high resistance or blocking state or condition each half cycle of the A.C. voltage as the instantaneous voltage nears zero and drops the current below the minimum holding current level, the current being momentarily interrupted during each half cycle. However, following each momentary half cycle interruption of the current flow, the low resistance state or condition of said at least portions or paths of the semiconductor material resumes the next half cycle when the applied voltage reaches a certain level (which may be substantially below the upper threshold voltage level). The semiconductor device is considered to be in its conducting state or condition despite such momentary return to the high resistance state or condition each half cycle. However, when the RMS or peak value of the A.C. voltage is decreased to at least a lower threshold voltage level, the low resistance state or condition does not resume each half cycle and the device is then considered to be in the blocking state or condition, this being illustrated in FIGS. 3 and 4. This voltage value at which the device fails to reconduct in the A.C. cycle is referred to as the lower threshold voltage value or level of the device. After the device becomes non-conducting, it cannot again become conducting until the RMS or peak voltage of the applied A.C. voltage becomes at least as great as the upper threshold voltage value of the device to produce the voltage-current curve of FIG. 4A.

FIGS. 2, 2A and 2B illustrate some exemplary physical forms of the threshold semiconductor device 2. They comprise an inactive and conducting body portion 10a of metal or the like or an inactive and conducting semiconductor material and one or more active semiconductor layers or films 10b, 10b', made in the manner described above. The electrodes 12 and 12' may comprise separate layers of metal or the like as illustrated in the embodiments of FIGS. 2A and 2B or one of the electrodes 12 may be formed by the conductive body portion 10a as illustrated in the embodiment of FIG. 2.

Referring now to FIG. 5 which illustrates the application of a pair of threshold semiconductor devices 2 and 2' in an exemplary A.C. phase control circuit designed in accordance with the present invention, one of the threshold semiconductor devices 2 is assumed to have a higher upper threshold voltage level than the other device 2'. The threshold semiconductor device 2 having the higher upper threshold voltage level is connected to pass the main load current fed from the source of A.C. voltage 16 which has an output which is a continuous sine wave as shown in FIG. 6. As illustrated, the device 2 is connected in a series or loop circuit including the source of A.C. voltage 16, a load 14 and the secondary winding 25b of a transformer 25. In the particular circuit of FIG. 5, one of the terminals or electrodes 12' of the threshold semiconductor device 2 is connected to a power supply line 22 extending to the source of A.C. voltage 16, which may be a conventional 60 cycle per second commercial power supply, and the other terminal or electrode 12 is connected to one end of the secondary winding 25b whose other end is connected to one end of the load 14. The other end of the load 14 is connected to a common power supply line 22' to which one of the terminals of the source of voltage 16 is connected.

The object of the circuit shown in FIG. 5 is to control the phase angle during each half cycle of the A.C. signal involved, during which the threshold semiconductor device 2 is in its conductive state. The upper threshold voltage level of the device 2 is selected so that it is higher than the peak value of the output of the source of voltage 16 (see FIG. 6) so that, in the absence of an additional voltage in the circuit, the device 2 will be in its high resistance or blocking state or condition. In accordance with this invention, the additional voltage is a variable phase voltage appearing across the secondary winding 25b of the transformer. This voltage is controlled by a control circuit including a phase shifter 27 which may be any one of a number of well known phase shifting devices. The phase shifter 27 is most desirably fed from the power supply lines 22—22' and provides at its output 27a an A.C. voltage at the same frequency as the output of the source of voltage 16, but variable in phase by a manually variable control knob 27b or the like. (Phase shifter 27, for example, may comprise a series circuit of an inductor or capacitor and a relatively high resistance to minimize power loss, the resistance, capacitor or inductor being variable so as to vary the phase of the voltage across one of the same.)

The output of the phase shifter (see FIG. 6A) appears between the output terminal 27a and the common power supply line 22', and the peak value of this voltage exceeds the upper threshold voltage level of the threshold semiconductor device 2'. This voltage is fed to a series circuit comprising the second threshold semiconductor device 2' and the primary winding 25a of the transformer 25. As the sinusoidal output of the phase shifter reaches the upper threshold voltage level of the device 2', the device will be triggered into its conductive state or condition each half cycle. The resulting current pulse flowing through the device 2' and the primary winding 25a will be substantially sinusoidal following triggering for substantially the remainder of each half cycle and will induce a voltage in the secondary 25b which, in conjunction with the output of the source of voltage 16, will raise the effective voltage applied across the threshold semiconductive device 2 above its upper threshold voltage level to trigger the same into its conductive state or condition. Both of the threshold semiconductor devices 2 and 2' will continue to conduct until the instantaneous values of the A.C. currents flowing therethrough reach the holding current value. This sequence of operation of the devices repeats each succeeding half cycle since they the perfectly symmetrical bi-directional devices, that is, they respond in the same way to positive and negative going voltages applied to the electrodes thereof. It is apparent that by varying the manual control 27b to vary the phase of the output of the phase shifter 27, the point in each half cycle of the output of the source of voltage 16 during which the threshold semiconductor devices become conductive will vary accordingly.

In the circuit just described, it was assumed that the upper threshold voltage levels of the devices 2 and 2' are different. However, the circuit is also operable if the threshold semiconductor devices 2 and 2' have an identical upper threshold voltage level provided the phase shifter 27 includes a step-up transformer which will provide an output voltage whose peak value exceeds the upper threshold voltage level of the threshold semiconductor device 2'.

The present invention has thus provided most advantageously by means of extremely inexpensive, two terminal, threshold semicoductor devices, an A.C. phase control circuit which inherently operates in a symmetrical manner with simple control circuitry.

What is claimed is:

1. An A.C. phase control circuit comprising: a load, a source of A.C. voltage for supplying the load with current, a transformer having a primary winding and a secondary winding, phase shifter means coupled to said source of A.C. voltage for providing at its output a variable phase A.C. voltage of the same frequency as the output of said source of A.C. voltage, a first and a second bi-directional semiconductor current controlling device each having two load terminals, means connecting said source of A.C. voltage, said load, the load terminals of said first device and said secondary winding in mutual series circuit relation, means connecting the output of said phase shifter means, said second device, and said primary winding in mutual series circuit relation wherein, upon conduction of said second device, the output of the phase shifter means is connected through the second device to the primary winding to induce a voltage in said secondary winding which is in voltage adding relationship to the output of said source of A.C. voltage, and each of said devices comprising a solid state semiconductor material having one state wherein at least portions thereof between the load terminals are in one state which is of high resistance and substantially an insulator for blocking the flow of current therethrough substantially equally in either or both directions when the peak value of an applied A.C. voltage is below an upper threshold voltage level, and having another state wherein said at least portions thereof between the load terminals are in another state which is of low resistance and substantially a conductor for conducting the flow of current substantially equally therethrough in either or both directions when the peak value of the applied voltage is raised above said upper threshold voltage level and the RMS value of the voltage remains above a lower threshold voltage level, the output of said source of A.C. voltage each half cycle thereof having a peak value which is less than the upper threshold level of said first device, the resultant of the voltage induced in said secondary winding and the output of said source of A.C. voltage each half cycle being above the upper threshold level of said first device, and said output of said phase shifter means having a peak value in excess of the upper threshold level of said second device, wherein said first device is triggered into said another conducting state at a point in each half cycle which varies with the phase of the voltage induced in said secondary winding, thereby to effect control over the duration of conduction thereof each half cycle.

2. The A.C. phase control circuit of claim 1 wherein the upper threshold voltage level of said second threshold semiconductor device is lower than that of said first device.

3. An A.C. phase control circuit comprising: a load, a source of A.C. sinusoidal voltage for supplying the load with current, a transformer having a primary winding and a secondary winding, phase shifter means coupled to said source of A.C. voltage for providing at its output a variable phase A.C. sinusoidal voltage of the same frequency as the output of said source of A.C. voltage, a first and a second bi-directional semiconductor current controlling device each having two load terminal means connecting said source of A.C. voltage, said load, the load terminals of said first device and said secondary winding in mutual series circuit relation, means connecting the output of said phase shifter means, said second device, and said primary winding in mutual series circuit relation wherein, upon conduction of said second device, the output of the phase shifter means is connected through the second device to the primary winding whereby a substantially sinusoidal current flows in said primary winding and second device, and a voltage is induced in said secondary winding which is in voltage adding relationship to the output of said source of A.C. voltage, and each of said devices comprising a solid state semiconductor material having one state wherein at least portions thereof between the load terminals are in one state which is of high resistance and substantially an insulator for blocking the flow of current therethrough substantially equally in either or both directions when the peak value of an applied A.C. voltage is below an upper threshold voltage level, and having another state wherein said at least portions thereof between the load terminals are in another state which is of low resistance and substantially a conductor for conducting the flow of current substantially equally therethrough in either or both directions when the peak value of the applied voltage is raised above said upper threshold voltage level and the RMS value of the voltage remains above a lower threshold voltage level, the output of said source of A.C. voltage each half cycle thereof having a peak value which is less than the upper threshold level of said first device, the resultant of the voltage induced in said secondary winding and the output of said source of A.C. voltage each half cycle being above the upper threshold level of said first device, and said output of said phase shifter means having a peak value in excess of the upper threshold level of said second device, wherein said first device is triggered into said another conducting state at a point in each half cycle which varies with the phase of the voltage induced in said secondary winding, thereby to effect control over the duration of conduction thereof each half cycle.

4. An A.C. phase control circuit comprising: a load, a source of A.C. voltage for supplying the load with current, a transformer having a primary winding and a secondary winding, phase shifter means coupled to said source of A.C. voltage for providing at its output a variable phase A.C. voltage of the same frequency as the output of said source of A.C. voltage, a first and a second symmetrical bi-directional semiconductor controlling device, each of said devices including semiconductor material means and two load terminals in non-rectifying contact therewith, said semiconductor means being of one conducting type, said semiconductor material means including means for providing a first condition of relatively high resistance for substantially blocking the A.C. current therethrough between the load terminals substantially equally in both half cycles of the A.C. current, said semiconductor material means including means responsive to an A.C. voltage of at least a threshold value applied to said load terminals for altering said first condition of relatively high resistance of said semiconductor material means for substantially instantaneously providing at least one path through said semiconductor material means between the load terminals having a second condition of relatively low resistance for conducting the A.C. current therethrough substantially equally in each half cycle of the A.C. current, said semiconductor material means including means for maintaining said at least one path of said semiconductor material means in its said second relatively low resistance conducting condition and providing a substantially constant ratio of voltage change to current change for conducting current at a substantially constant voltage therethrough between the load terminals substantially equally in each half cycle of the A.C. current which voltage is the same for increase and decrease in the instantaneous current above a minimum instantaneous holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaneous current, through said at least one path in its said relatively low resistance conducting condition, to a value below said minimum instantaneous current holding value in each half cycle of the A.C. current for immediately causing realtering of said second relatively low resistance conducting condition of said at least one path to said first relatively high resistance blocking condition in each half cycle of the A.C. current for substantially blocking the A.C. current therethrough substantially equally in each half cycle of the A.C. current, means connecting said source of A.C. voltage, said load, the load terminals of said first device and said secondary winding in mutual series circuit relation, the output of said source of A.C. voltage each half cycle thereof having a peak which is less than the threshold voltage value of said first device, means connecting the output of said phase shifter means, the load terminals of said second device and said primary winding in mutual series circuit retation wherein, upon conduction of said second device, a voltage is induced in said secondary winding which is in adding relationship to the output of said source of A.C. voltage, the resultant of the voltage induced in said secondary winding and the output of said source of A.C. voltage each half cycle being above the threshold voltage value of said first device, and said output of said phase shifter means having a peak value in excess of the threshold voltage value of said second device, wherein said first device is triggered into its low resistance conducting condition at a point in each half cycle which varies with the phase of the voltage induced in said secondary winding, thereby to effect control over the duration of conduction of said first device each half cycle.

5. An A.C. phase control circuit comprising: a load, a source of A.C. voltage for supplying the load with current, a transformer having a primary winding and a secondary winding, phase shifter means coupled to said source of A.C. voltage for providing at its output a variable phase A.C. voltage of the same frequency as the output of said source of A.C. voltage, a symmetrical bidirectional semiconductor current controlling device including semiconductor material means and two load terminals in non-rectifying contact therewith, said semiconductor material means being of one conducting type, said semiconductor material means including means for providing a first condition of relatively high resistance for substantially blocking A.C. current therethrough between the load terminals substantially equally in both half cycles of the A.C. current, said semiconductor material means including means responsive to an A.C. voltage of at least a threshold value applied to said load terminals for altering said first condition of relatively high resistance of said semiconductor material means for substantially instantaneously providing at least one path through said semiconductor material means between the load terminals having a second condition of relatively low resistance for conducting the A.C. current therethrough substantially equally in each half cycle of the A.C. current, said semiconductor material means including means for maintaining said at least one path of said semiconductor material means in its said second relatively low resistance conducting condition and providing a substantially constant ratio of voltage change to current change for conducting current at a substantially constant voltage therethrough between the load terminals substantially equally in each half cycle of the A.C. current which voltage is the same for increase and decrease in the instantaneous current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaaneous current, through said at least one path in its said relatively low resistance conducting condition, to a value below said minimum instantaneous current holding value in each half cycle of the A.C. current for immediately causing realtering of said second relatively low resistance conducting condition of said at least one path to said first relatively high resistance blocking condition in each half cycle of the A.C. current for substantailly blocking the A.C. current therethrough substantially equally in each half cycle of the A.C. current, means connecting said source of A.C. voltage, said load, the load terminals of said device and said secondary winding in mutual series circuit relation, the output of said source of A.C. voltage each half cycle thereof having a peak value which is less than the threshold voltage value of said device, means connecting the output of said phase shifter means and said primary winding in mutual series circuit relation wherein a voltage is induced in said secondary winding which is in adding relationship to the output of said source of A.C. voltage, the resultant of the voltage induced in said secondary winding and the output of said source of A.C. voltage each half cycle being above the threshold voltage value of said device wherein said device is triggered into its low resistance conducting condition at a point in each half cycle which varies with the phase of the voltage induced in said secondary winding, thereby to effect control over the duration of conduction of the device each half cycle.

References Cited

UNITED STATES PATENTS 3,188,490   6/1965   Hoff et al. _____ 317—235

JOHN W. HUCKERT, *Primary Examiner.*

J. CRAIG, *Assistant Examiner.*